United States Patent
Oh et al.

(10) Patent No.: US 8,675,545 B2
(45) Date of Patent: Mar. 18, 2014

(54) METHOD AND APPARATUS FOR ALLOCATING TRAFFIC RESOURCES IN MULTI-BEAM SATELLITE COMMUNICATION SYSTEM

(75) Inventors: Dae Sub Oh, Daejeon (KR); Hee Wook Kim, Daejeon (KR); Do-Seob Ahn, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 238 days.

(21) Appl. No.: 12/861,545

(22) Filed: Aug. 23, 2010

(65) Prior Publication Data

US 2011/0044237 A1    Feb. 24, 2011

(30) Foreign Application Priority Data

Aug. 24, 2009    (KR) .................. 10-2009-0078395
Aug. 23, 2010    (KR) .................. 10-2010-0081344

(51) Int. Cl.
*H04J 3/08*    (2006.01)
*G01R 31/08*    (2006.01)

(52) U.S. Cl.
USPC ........................................ 370/326; 370/252

(58) Field of Classification Search
USPC .................. 370/326, 252; 455/12.1
See application file for complete search history.

(56) References Cited

U.S. PATENT DOCUMENTS

| | | | |
|---|---|---|---|
| 6,084,869 A * | 7/2000 | Fishman et al. | 370/348 |
| 7,346,069 B2 | 3/2008 | Lee et al. | |
| 7,554,937 B2 * | 6/2009 | Lim et al. | 370/316 |
| 7,995,515 B2 * | 8/2011 | Thesling | 370/322 |
| 2001/0034236 A1 * | 10/2001 | Tong et al. | 455/450 |
| 2002/0080727 A1 * | 6/2002 | Kim et al. | 370/252 |
| 2003/0050008 A1 * | 3/2003 | Patterson et al. | 455/12.1 |
| 2005/0118947 A1 * | 6/2005 | Ames et al. | 455/12.1 |
| 2008/0159419 A1 * | 7/2008 | Smith et al. | 375/260 |
| 2009/0225740 A1 | 9/2009 | Ku et al. | |
| 2009/0323839 A1 * | 12/2009 | Baker et al. | 375/260 |
| 2010/0120418 A1 * | 5/2010 | Agarwal | 455/427 |
| 2011/0280164 A1 * | 11/2011 | Luo et al. | 370/281 |

FOREIGN PATENT DOCUMENTS

| | | |
|---|---|---|
| JP | 2009-194509 A | 8/2009 |
| KR | 2004-0051007 A | 6/2004 |
| KR | 10-0714199 B1 | 4/2007 |

* cited by examiner

*Primary Examiner* — Mark Rinehart
*Assistant Examiner* — Angel Brockman
(74) *Attorney, Agent, or Firm* — Rabin & Berdo, P.C.

(57) ABSTRACT

In a system where satellite communication using multi-beams is performed for each group including a plurality of beams, a required data transmission rate of each beam is detected for each group, more traffic resources are allocated to a beam having a higher required data transmission rate than other beams based on the detection result, and data traffic transmitted to each beam in the group is adaptively controlled.

5 Claims, 11 Drawing Sheets

METHOD AND APPARATUS FOR ALLOCATING TRAFFIC RESOURCES IN MULTI-BEAM SATELLITE COMMUNICATION SYSTEM

CROSS-REFERENCE TO RELATED APPLICATION

This application claims priority to and the benefit of Korean Patent Application Nos. 10-2009-0078395 and 10-2010-0081344 filed in the Korean Intellectual Property Office on Aug. 24, 2009 and Aug. 23, 2010, the entire contents of which are incorporated herein by reference.

BACKGROUND OF THE INVENTION (a) Field of the Invention

The present invention relates to a method and apparatus for allocating traffic resources in a multi-beam satellite communication system, and more particularly, to a method and apparatus for allocating traffic resources for data traffic control between multi-beams in a multi-beam satellite communication system.

(b) Description of the Related Art

In satellite communication systems, a wave radiated from a satellite to the ground surface is referred to as a beam, and the ground surface irradiated by the beam is referred to as a cell. The satellite communication systems include a single beam satellite communication system in which a satellite uses a single beam, and a multi-beam satellite communication system in which two or more different beams are used. A satellite communication system using multi-beams generally has higher data transmission efficiency than a system using a single beam.

In general, in a satellite communication system using multi-beams, each traffic resource that the satellite transmits to the respective beams is the same. That is, the satellite sends and receives data to and from each cell by using the same transmission algorithm.

However, even when the data transmission rate required for each cell varies, data transmission is done in accordance with the same transmission algorithm. That would cause some situations that transmission resources for a cell requiring a high data transmission rate are not sufficient, whereas, transmission resources are left unused for a cell capable of providing a service with a low data transmission rate.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for efficiently allocating traffic resources to each cell in a satellite communication system using multi-beams.

An exemplary embodiment of the present invention provides a method for allocating traffic resources in a system where satellite communication using multi-beams is performed for each group including at least two beams, the method including: detecting a data transmission rate required for each beam included in one group; selecting a first beam having a required data transmission rate that is higher than those of other beams by more than a preset value based on the detected data transmission rate required for each beam corresponding to each cell; and allocating more traffic resources for data transmission to the first beam compared to the other beams of the group except the first beam.

Another exemplary embodiment of the present invention provides an apparatus for allocating traffic resources in a system where satellite communication using multi-beams is performed for each group including at least two beams, the apparatus including: a traffic resource request information collection unit for collecting traffic resource request information for each cell corresponding to each beam included in one group; a traffic resource optimization operation unit for calculating a required data transmission rate based on the collected traffic resource request information for each cell and calculating an amount of traffic resources per beam corresponding to each cell based on the calculated required data transmission rate; and allocating traffic resources to each beam based on the calculated amount of traffic resources.

In the method and apparatus for allocating traffic resources according to an exemplary embodiment of the present invention, the traffic resources are at least one of time resources, frequency resources, and code resources.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this specification, a mobile earth station (MES) may refer to a terminal, a mobile station (MS), a mobile terminal (MT), a subscriber station (SS), a portable subscriber station (PSS), user equipment (UE), or an access terminal (AT). The mobile terminal may include all or part of the functions of the mobile station, the subscriber station, the portable subscriber station, and the user equipment.

In this specification, a gateway earth station may refer to a base station (BS), an access point (AP), a radio access station (RAS), a node B, a base transceiver station (BTS), or an MMR (mobile multihop relay)-BS. The gateway earth station may include all or part of the functions of the access point, the radio access station, the node B, the base transceiver station, and the MMR-BS.

Hereinafter, an apparatus and method for allocating traffic resources in a satellite communication system using multi-beams according to an exemplary embodiment of the present invention will be described with reference to the accompanying drawings.

Figure 1:
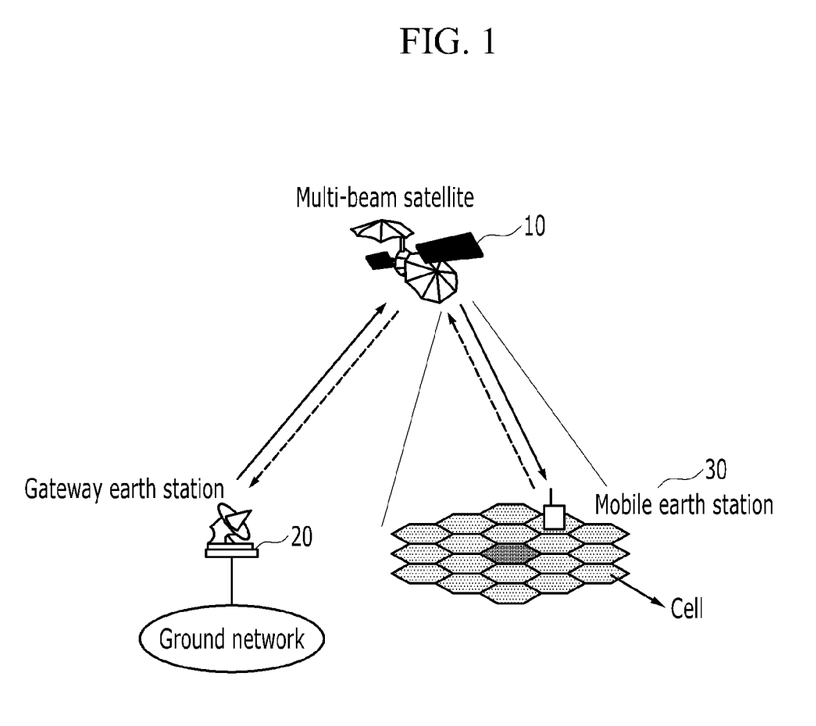
FIG. 1 is a structural view of a satellite communication system using multi-beams according to an exemplary embodiment of the present invention.

FIG. 1 is a structural view of a satellite communication system using multi-beams according to an exemplary embodiment of the present invention.

As shown in the accompanying FIG. 1, the satellite communication system using multi-beams according to the exemplary embodiment of the present invention includes a multi-beam satellite 10, which is a space station, a gateway earth station 20, and a mobile earth station 30.

The satellite 10 relays communication between the gateway earth station 20 and the mobile earth station 30 or between mobile earth stations 30, and forms a communication link with the mobile earth station 30 located in a service area divided into a plurality of cells through a predetermined beam. Located in any one cell within the service area, the mobile earth station 30 forms a communication link with the satellite 10 through a beam corresponding to the cell.

The gateway earth station 20 functions as a gateway that connects other radio communication networks, such as a plurality of ground networks or the Internet, and a satellite communication network, and operates and manages a multi-beam satellite communication network.

Figure 2:
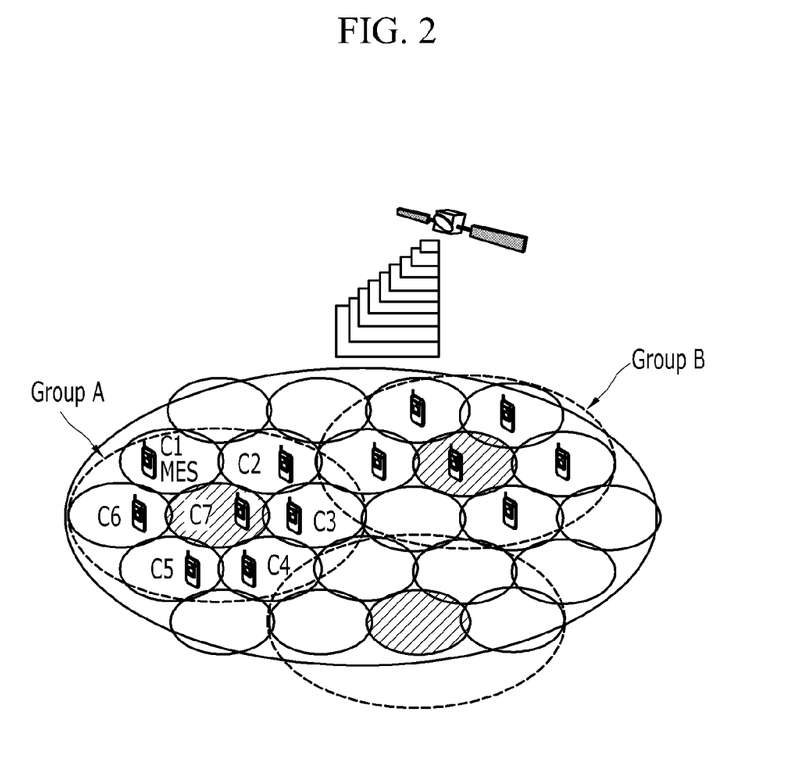
FIG. 2 is a conceptual view showing a method for allocating traffic resources to each group in a satellite communication system using multi-beams according to an exemplary embodiment of the present invention.

FIG. 2 is a conceptual view showing a method for allocating traffic resources to each group in a satellite communication system using multi-beams according to an exemplary embodiment of the present invention.

Conventionally, beams are transmitted to every cell by using the same transmission algorithm, whereas, in the exemplary embodiment of the present invention, a data transmission rate required for each cell is detected and traffic resources are adaptively allocated to each beam for the corresponding cell based on the detection result. Here, the traffic resources are elements for determining a data transmission rate, and include frequency, time, code, etc., which are system parameters that affect the data transmission rate.

As shown in FIG. 2, the satellite communication system according to the exemplary embodiment of the present invention divides cells, each of which is a ground surface to which a beam belongs, i.e., the coverage region of a beam, into a plurality of groups and manages them, and adaptively allocates traffic resources to each group. Concretely, the data transmission rate required for each cell corresponding to a beam included in a group is detected, and traffic resources are adaptively allocated in accordance with the detected required data transmission rate. Among cells included in one group, if a data transmission rate required by one cell is higher than required data transmission rates of other cells by more than a preset value, more traffic resources are allocated to a beam corresponding to the cell requiring a high data transmission rate than to other beams within the availability of traffic resources. For example, as shown in FIG. 2, it is assumed that there is a satellite communication system in which seven beams are used for one group, and the frequency reuse rate is 1. In this satellite communication system, the required data transmission rate of one cell C7 among the seven cells C1, C2, . . . , C7 is higher than those of the other cells C1 to C6, so traffic resources for a beam to be transmitted to the cell C7 are increased.

In this exemplary embodiment of the present invention, in order to detect the required data transmission rate for each cell, at least one of the number of mobile earth stations placed in the cell and a required transmission rate that varies depending on the type of service requested by each mobile earth station can be used.

For example, the number of mobile earth stations placed in each cell is detected, and if the number of mobile earth stations of a certain cell is higher than the number of mobile earth stations in other cells by more than a preset number, it is determined that the data transmission rate required for the corresponding cell is higher than those of other cells, and therefore traffic resources for the beam allocated to the corresponding cell are increased.

Alternatively, a required rate contained in a data request signal transmitted from an earth station corresponding to each cell is detected, and if the required rate contained in the data request signal from a certain cell is higher than required rates for other cells by more than a preset value, it is determined that the data transmission rate required by the beam for the corresponding cell is higher than those of other cells, and therefore traffic resources for the beam allocated to the corresponding cell are increased.

The data request signal transmitted from the mobile earth station 30 is channel information containing data transmission rate, transmission status, data transmission request, etc. This information is transmitted to the gateway earth station 20 via the satellite 10, and the traffic resource allocation apparatus according to the exemplary embodiment of the present invention monitors such channel information and detects a required data transmission rate of the corresponding beam.

Transmission rates requested by respective mobile earth stations 30 existing in all beams within a service coverage are classified for each beam of the satellite to calculate a total per-beam transmission rate. In the exemplary embodiment of the present invention, there is provided a method for efficiently managing transmission resources, i.e., traffic resources, by comparing differences in required transmission rates generated between beams. As the method for allocating traffic resources allocated per beam to the respective mobile earth stations 30, conventional methods known to those of skill in the art can be used. Although, in the exemplary embodiment of the present invention, data request signals transmitted from the mobile earth stations 30 to get various services and the number of the mobile earth stations 30 operating within each cell are used to detect the required data transmission rate for each cell, the present invention is not necessarily limited thereto.

Figure 3A:
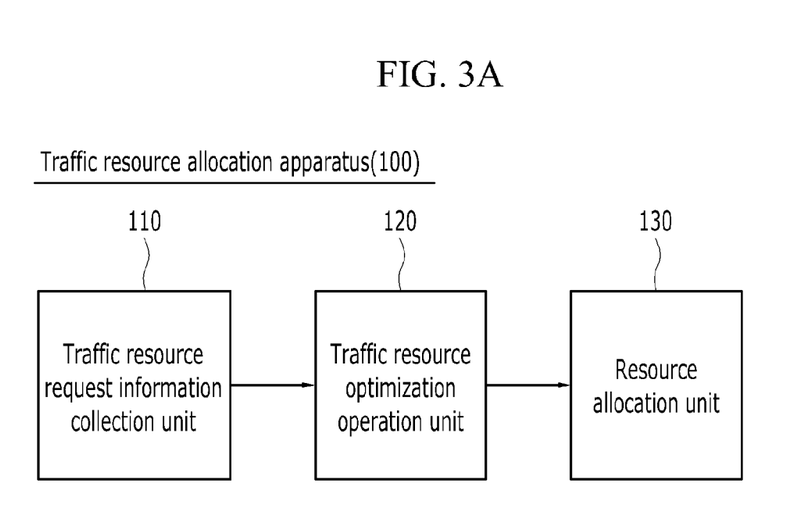
FIG. 3A is a view showing a structure of an apparatus for allocating traffic resources according to an exemplary embodiment of the present invention.
Figure 3B:
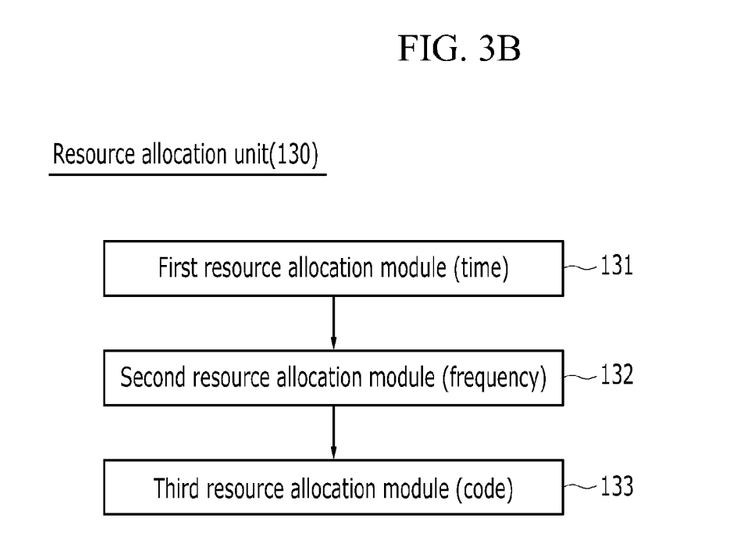
FIG. 3B is an illustration showing a structure of a resource allocation unit shown in FIG. 3A.

FIG. 3A is a view showing a structure of an apparatus for allocating traffic resources according to an exemplary embodiment of the present invention, and FIG. 3B is an illustration showing a structure of a resource allocation unit shown in FIG. 3A.

As shown in the accompanying FIG. 3A, the traffic resource allocation apparatus according to the exemplary embodiment of the present invention includes a traffic resource request information collection unit 110, a traffic resource optimization operation unit 120, and a resource allocation unit 130.

The traffic resource request information collection unit 110 detects a required data transmission rate for each cell in each group, and, as described above, at least one of the number of mobile earth stations placed in a cell and a required rate contained in a data request signal transmitted from the mobile earth station 30 corresponding to the cell can be used for detection. The traffic resource optimization operation unit 120 detects the required data transmission rate for each cell collected by the traffic resource request information collection unit 110, and calculates an amount of traffic resources to be allocated per beam by a distribution algorithm so that the distribution of traffic resources required for each beam is optimized in accordance with the detected required data transmission rate.

The resource allocation unit 130 allocates the calculated amount of traffic resources to each beam. Under the condition that the required data transmission rate differs for each beam, time, channel (bandwidth), and code resources can be efficiently distributed in accordance with the required data transmission rate of each beam.

First, in the case of allocation of time resources among traffic resources, the traffic resource allocation apparatus 100 variably allocates time slots constituting the time resources, and allocates more time slots to a beam corresponding to a cell requiring a high data transmission rate. In the allocation of time slots, time slots desired to be allocated may be continuously allocated to beams, or time slots desired to be allocated may be discontinuously allocated to beams.

In the case of allocation of channel resources, the traffic resource allocation apparatus 100 adaptively allocates channel resources divided by a predetermined frequency bandwidth, more specifically, variably allocates channels constituting frequency resources, and allocates more channels to a beam corresponding to a cell requiring a high data transmission rate than to other beams.

In the case of code resources, the traffic resource allocation apparatus 100 variably allocates diffusion codes constituting code resources, and allocates data frames having more diffusion codes to a beam corresponding to a cell requiring a high data transmission rate than to other beams. Although code resources are allocated in the method of allocating more pseudo noise (PN) codes herein, serving as diffusion codes for decoding respective codes, to a particular beam, the present invention is not limited to the PN codes.

For such adaptive traffic resource allocation, the resource allocation unit 130 may be implemented, as shown in FIG. 3B, in such a fashion to include at least one of a first resource allocation module 131, a second resource allocation module 132, and a third resource allocation module 133. The first resource allocation module 131 variably allocates time slots constituting time resources, and allocates more time slots to a first beam requiring a high data transmission rate than to other beams.

The second resource allocation module 132 variably allocates channels constituting frequency resources, and allocates more channels to the first beam than to other beams.

The third resource allocation module 133 variably allocates diffusion codes constituting code resources, and allocates more diffusion codes to the first beam than to other beams.

The traffic resource allocation apparatus 100 according to the exemplary embodiment of the present invention having such a structure is placed in the gateway earth station 20, and adaptively manages traffic resources for a beam transmitted to each cell.

Next, a method for allocating traffic resources according to an exemplary embodiment of the present invention will be described.

Figure 4:
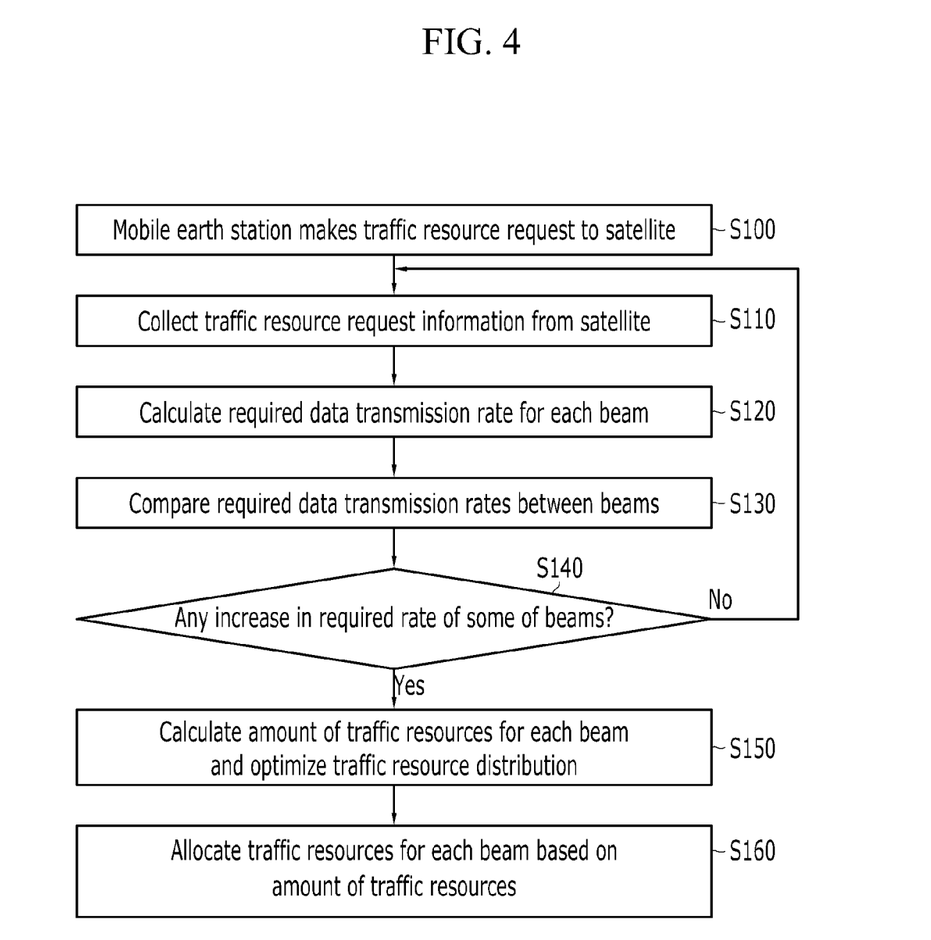
FIG. 4 is a flowchart of a method for allocating traffic resources according to an exemplary embodiment of the present invention.

FIG. 4 is a flowchart of a method for allocating traffic resources according to an exemplary embodiment of the present invention. First, the traffic resource allocation apparatus 100 according to the exemplary embodiment of the present invention collects traffic resource request information requested by each mobile earth station 30 (S100 and S110). Each mobile earth station 30 transmits a data request signal, which is channel information containing data transmission rate, transmission status, data transmission request, etc., to the satellite 10, and the traffic resource allocation apparatus 100 collects traffic resource request information of each mobile earth station 30 based on the data request signal provided from the satellite.

The traffic resource allocation apparatus 100 calculates a required data transmission rate corresponding to the total amount of traffic resources required for the mobile earth stations of each cell based on the collected traffic resource request information (S120), and required data transmission rates calculated for each beam corresponding to the cell are compared with each other (S130).

As a result of comparison, if the two required data transmission rates are similar, that is, if differences between the required data transmission rates of the beams are less than a preset value, a required data transmission rate is continuously monitored for each beam without taking any action.

If the required data transmission rate of a particular beam is greater than the required data transmission rates of other beams by more than a preset value (S140), the traffic resource allocation apparatus 100 calculates an amount of traffic resources for each beam so as to allocate the traffic resources at a value optimized for each beam (S150). Also, the traffic resources are allocated for each beam based on the calculated amount of traffic resources (S160).

Next, based upon the above-described traffic resource allocation method, a method for allocating time resources, which are traffic resources, according to a first exemplary embodiment of the present invention will be described.

Figure 5:
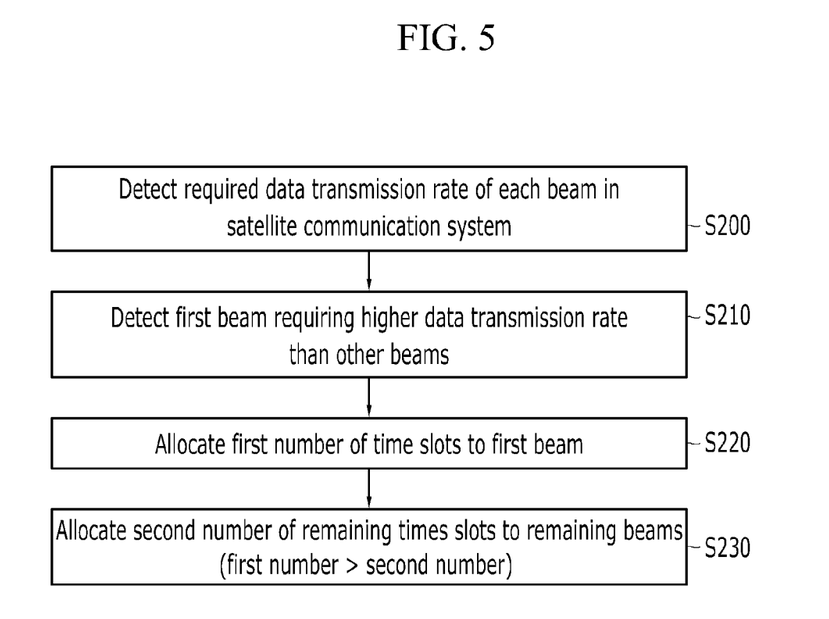
FIG. 5 is a flowchart of a time resource allocation method that is one method for allocating traffic resources according to a first exemplary embodiment of the present invention.
Figure 6A:
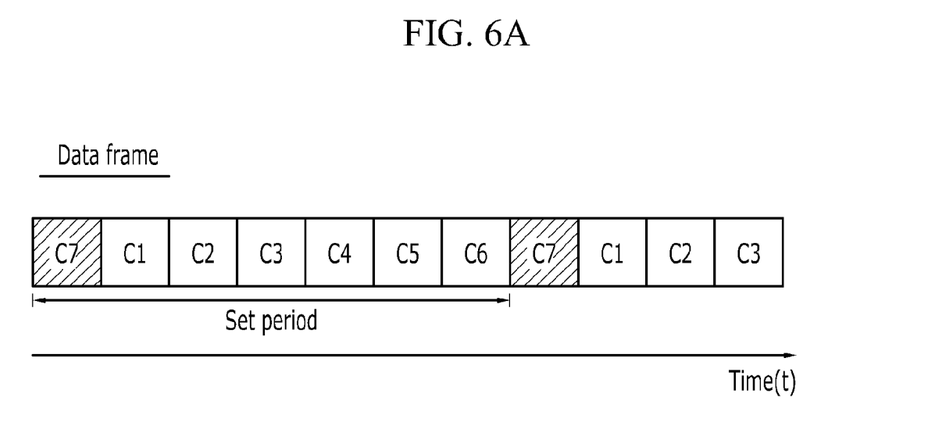
FIGS. 6A to 6C are illustrations showing the time resource allocation method according to the first exemplary embodiment of the present invention.
Figure 6B:
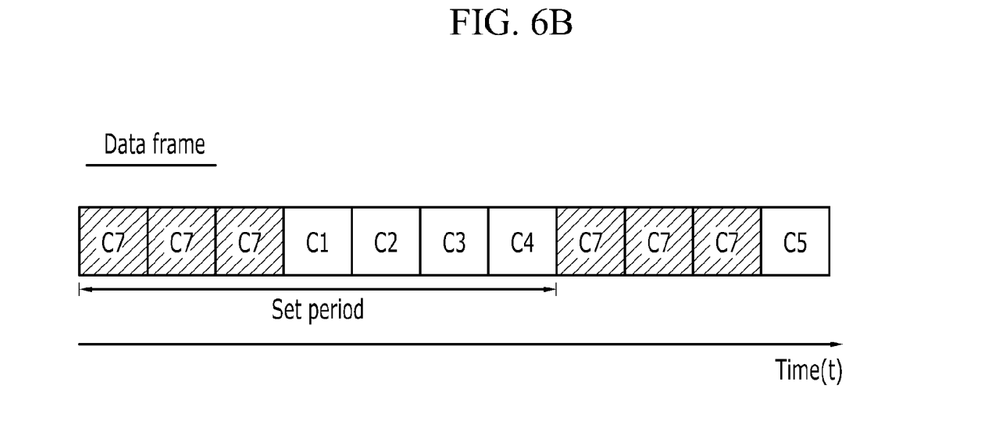
Figure 6C:
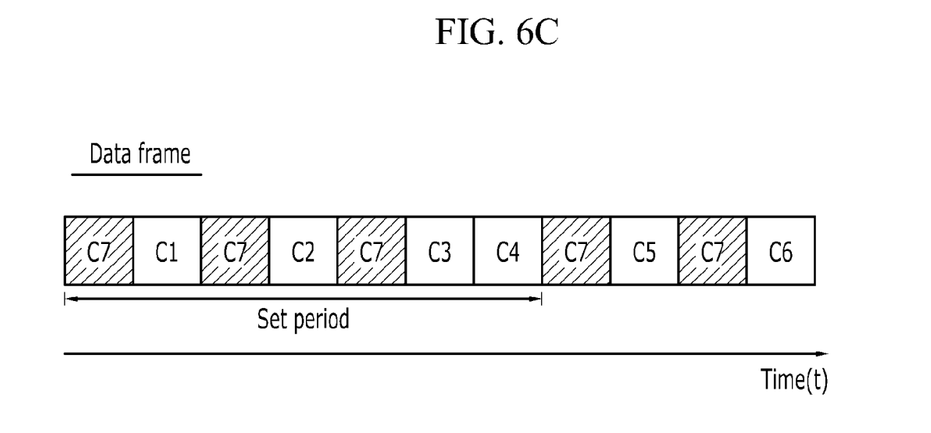

FIG. 5 is a flowchart of a time resource allocation method that is a method for allocating traffic resources according to a first exemplary embodiment of the present invention. FIGS. 6A to 6C are illustrations showing the time resource allocation method according to the first exemplary embodiment of the present invention.

As shown in the accompanying FIG. 5, the traffic resource allocation apparatus 100 detects a data transmission rate required for each of cells included in each of groups (S200), as shown in FIG. 4, and adaptively allocates traffic resources to each beam corresponding to each cell based on the detection results. Specifically, if the required data transmission rate of the first beam, among beams included in one group, is higher than those of the other beams, more time resources are allocated to the first beam (S210 and S220). Also, the remaining time resources except the time resources allocated to the first beam are allocated to the other beams except the first beam (S230).

For example, it is assumed that, in the case that one group is divided into seven cells, as shown in FIG. 2, time resources allocated to the respective cells are as shown in FIG. 6A. That is, a signal corresponding to a beam of the satellite 10 is transmitted in a data frame having a predetermined length, and the data frame is divided into time slots having a predetermined length. The same time slots are allocated to each beam during a set period when resource allocation is performed, and a transmission frame is transmitted to the corresponding beam during the allocated time slots.

However, if a beam (hereinafter referred to as "beam C7") corresponding to cell C7 is denoted by a first beam requiring a higher data transmission rate than the other beams, more time slots are allocated to the first beam C7 so as to sufficiently transmit data required for the first beam C7. The time slots allocated to the first beam C7 may be continuously or discontinuously allocated.

Of the entire time slots allocated to the corresponding group during the set period for transmitting data frames, a first number of time slots are allocated to the first beam C7, and the remaining number of time slots are allocated to the other beams C1 to C6. If the number of time slots allocated to each of the remaining beams C1 to C6 is denoted by a second number, the first number is greater than the second number. In this case, as shown in FIG. 6B, the first number of time slots are continuously allocated to the first beam C7.

For example, if the number of time slots allocated to one group during a set period is seven, three time slots are allocated to the first beam C7, and the remaining four time slots are allocated to the remaining beams C1 to C6. In this case, the three time slots allocated to the first beam C7 are continuously allocated, data transmission for the first beam C7 is performed for the first to third time slots within the set period, and data transmission for the remaining beams C1 to C6 is performed for the remaining fourth to seventh time slots.

At this point, the number of time slots used as resources for data transmission for the remaining beams except the first beam C7 during the set period is small, so data transmission for the remaining beams C1 to C6 can be performed over two set periods. For example, under the assumption that one time slot is allocated to each of the remaining beams C1 to C6, data transmission for the first beam C7 is performed for the time slots (first to third time slots), data transmission for the beam C2 is performed for the fifth time slot, data transmission for the beam C3 is performed for the sixth time slot, and data transmission for the beam C4 is performed for the seventh time slot, and then data transmission for the beam C5 is performed for the fourth time slot of the next set period and data transmission for the beam C6 is performed for the fifth time slot thereof. As above, depending on time resource conditions, time slots are allocated, over two or more set periods, to the remaining beams not labeled as the first beam, to thus perform data transmission. Here, the priorities of the remaining beams C1 to C6 in allocating time slots firstly to a certain cell may vary, and for example, the priorities may be defined according to the required data transmission rates of the cells.

On the contrary to the above-description, the first number of time slots may be discontinuously allocated to the first beam C7.

For example, as stated above, it is assumed that, if the number of time slots allocated to one group during a set period is seven, three time slots are allocated to the first beam C7. In this case, it is not that three time slots are continuously allocated to the first beam C7, but that three time slots are discontinuously allocated to the first beam C7 as shown in FIG. 6C. For example, the three time slots assigned to the first beam C7 are discontinuously allocated at predetermined intervals in such a manner so as to allocate the first time slot in one set period to the first beam C7, allocate the second time slot to the beam C1 among the remaining beams, allocate the third time slot again to the first beam C7, allocate the fourth time slot to the beam C2 among the remaining beams, and allocate the fifth time slot again to the first beam C7. Of course, in this case, the intervals at which the first number of time slots assigned to the first beam C7 are discontinuously allocated can be adjusted, for example, by allocating the first time slot to the first beam C7, respectively allocating the second and third time slots to the beams C1 and C2 among the remaining beams, and allocating the fourth time slot again to the first beam C7. Moreover, the priorities of the remaining beams C1 to C6 in allocating time slots firstly to a certain beam may vary.

Next, a frequency resource allocation method, which is a method for allocating traffic resources according to a second exemplary embodiment of the present invention will be described.

Figure 7:
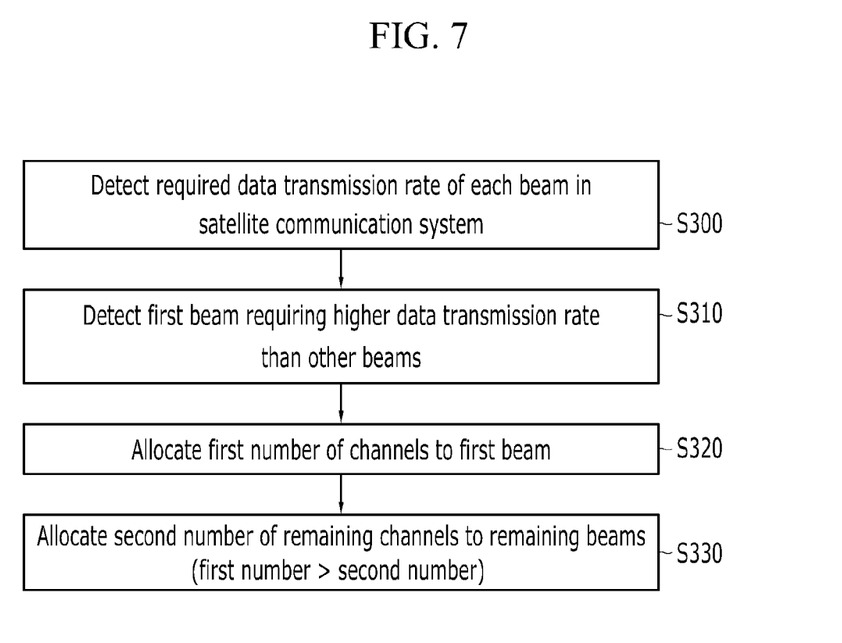
FIG. 7 is a flowchart of a time resource allocation method that is one method for allocating traffic resources according to a second exemplary embodiment of the present invention.

FIG. 7 is a flowchart of a time resource allocation method which is a method for allocating traffic resources according to a second exemplary embodiment of the present invention.

Like the above-described first exemplary embodiment, the traffic resource allocation apparatus 100 detects a data transmission rate required for each of cells included in each of groups (S300), and, based on the detection result, if the required data transmission rate of the first beam, among beams included in one group, is higher than those of the other beams, more frequency resources, i.e., channel resources, are allocated to the first beam (S310 and S320). Also, the remaining channels except the channels allocated to the first beam are allocated to the other beams except the first beam (S330).

Specifically, a signal corresponding to a beam of the satellite 10 is transmitted through multiple carriers, and the entire signal is composed of a plurality of subcarriers having a predetermined frequency bandwidth. Among the channels constituting the frequency resources and having a predetermined subcarrier frequency, a first number of channels are allocated to the first beam, and the remaining channels are allocated to the remaining beams. If the number of channels allocated each of the remaining beams C1 to C6 is denoted by a second number, the first number is greater than the second number. For example, if ten channels are operated at a frequency bandwidth of 10 MHz, each channel has a bandwidth of 1 MHz. At this point, four to five channels are allocated to the first beam C7 considered as requiring a high data transmission rate, and the remaining channels are allocated to the remaining beams C1 to C6, thereby efficiently controlling the data transmission rates of the beams included in the group.

Next, a traffic resource allocation method, which is a method for allocating traffic resources according to a third exemplary embodiment of the present invention will be described.

Figure 8:
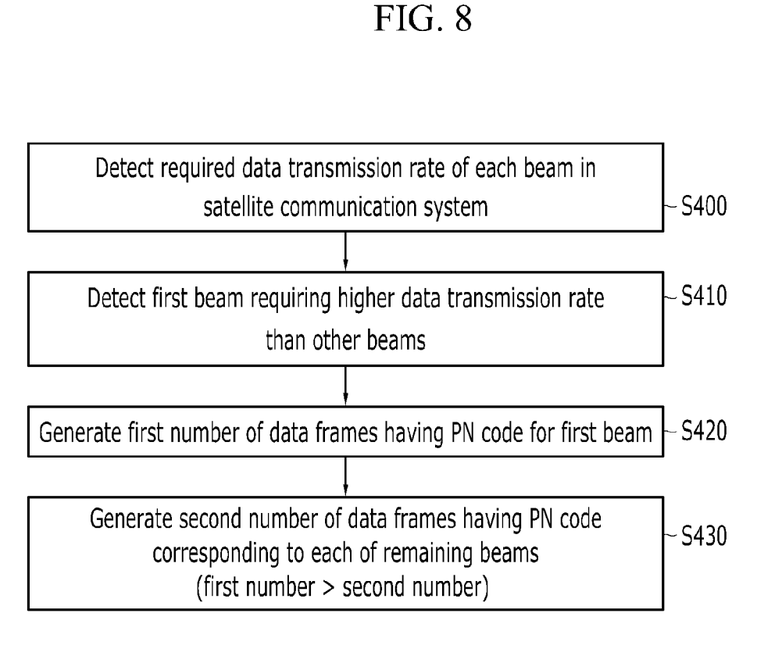
FIG. 8 is a flowchart of a code resource allocation method that is one method for allocating traffic resources according to a third exemplary embodiment of the present invention.

FIG. 8 is a flowchart of a code resource allocation method that is a method for allocating traffic resources according to a third exemplary embodiment of the present invention.

Like the above-described first and second exemplary embodiments, the traffic resource allocation apparatus 100 detects a data transmission rate required for each of cells included in each of groups (S400), and, based on the detection result, if the required data transmission rate of the first beam, among beams included in one group, is higher than those of the other beams (S410), more frequency resources, i.e., channel resources, are allocated to the first beam (S420 and S430).

Specifically, transmission symbols constituting a packet are diffusely transmitted by diffusion codes, and transmission frames including packets are divided by the diffusion codes in the code resources. In order to allocate the diffusion codes, e.g., PN codes, constituting the code resources to each beam and allocate more PN codes to the first beam requiring a higher data transmission rate, more frames having a PN code corresponding to the first beam are generated and provided to the first beam. That is, a first number of data frames having the corresponding PN code are generated and allocated to the first beam, and a second number of data frames having a corresponding PN code are generated and allocated to each of the remaining beams. Herein, the first number is greater than the second number. Therefore, more data transmission frames having the same PN code are generated and provided to the first beam requiring a high data transmission rate than to the other beams, thereby efficiently controlling data traffic for the first beam.

Meanwhile, two or more of the traffic resource allocation methods described in the above-stated first to third exemplary embodiments may be combined to allocate traffic resources to each beam. For instance, the first and second exemplary embodiments may be combined to allocate more time resources and frequency resources to the first beam requiring a higher data transmission rate than to the others. Further, the above-stated exemplary embodiments may be combined so that time resources, frequency resources, and code resources may be selectively combined to allocate more traffic resources to a beam requiring a high data transmission rate, thereby efficiently controlling the data transmission rate for the beams in a group.

In each of the above-stated exemplary embodiments, the expressions "first number" and "second number" are used to explain the numbers of time resources, frequency resources, and code resources for the convenience of explanation, the first number and second number as described in each of the exemplary embodiments may have different values for each of the exemplary embodiments or may have the same value.

According to an exemplary embodiment of the present invention, data traffic for a cell corresponding to each beam can be efficiently controlled by adaptively allocating traffic resources to each beam in accordance with a data transmission rate required by each cell in a satellite communication system using multi-beams.

Moreover, based upon the data transmission rate required by each cell, traffic resources of a beam having the remaining available resources are additionally allocated to a beam requiring a high data transmission rate, thereby efficiently controlling limited data traffic.

The exemplary embodiments of the present invention are not only realized by the method and device, but also realized by a program for realizing functions corresponding to the configurations of the traffic resource allocation method according to the exemplary embodiments of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for allocating traffic resources in a system where satellite communication with a plurality of mobile earth stations is performed using a plurality of beams, each beam corresponding to a cell, the method comprising:
dividing the plurality of beams into a plurality of groups of beams, each group including at least two beams; and
for each of the plurality of groups:
detecting a data transmission rate required for each beam of the group by collecting traffic resource request information from ones of the plurality of mobile earth stations placed in the cell corresponding to said each beam;
selecting, from the group, a first beam having a required data transmission rate that is higher than those of the other beams by more than a preset value, based on the detected required data transmission rates of the beams of the group; and
allocating more diffusion codes that constitute the traffic resources for data transmission to the first beam than to the other beams of the group.

2. The method of claim 1, wherein, in the detecting of the required data transmission rate, a number of mobile earth stations placed in the cell corresponding to said each beam is checked, and the required data transmission rate is detected based on the checked number of mobile earth stations.

3. The method of claim 1, wherein, in the detecting of the required data transmission rate, a data request signal is received from one of the mobile earth stations placed in the cell corresponding to said each beam, and the required data transmission rate of said each beam is detected based on a requested data amount contained in the received data request signal.

4. The method of claim 1, wherein the allocation comprises generating a first number of data transmission frames, each having a diffusion code corresponding to the first beam, and allocating the first number of data transmission frames to the first beam, and
generating a second number of data transmission frames having corresponding diffusion codes for the other beams, and allocating the second number of data transmission frames to a corresponding one of the other beams of the group,
wherein the first number is greater than the second number.

5. An apparatus for allocating traffic resources in a system where satellite communication with a plurality of mobile earth stations is performed using a plurality of beams, each beam corresponding to a cell, the apparatus comprising:
a traffic resource request information collection unit for dividing the plurality of beams into a plurality of groups of beams, each group including at least two beams, and collecting traffic resource request information from the plurality of mobile earth stations for each beam of each of the plurality of groups;
a traffic resource optimization operation unit for calculating, for each of the plurality of groups, a required data transmission rate based on the collected traffic resource request information for each beam of the group, and calculating an amount of traffic resources for each beam of the group based on the calculated required data transmission rate; and
a resource allocation unit for allocating, for each of the plurality of groups, the amount of the traffic resources to the each beam of the group based on the calculated amount of traffic resources, wherein the resource allocation unit
selects, from each of the plurality of groups, a first beam requiring a higher data transmission rate than the other beams of the group by a preset value, and
variably allocates more diffusion codes that constitute the traffic resources to the first beam than to the other beams of the group.

* * * * *